June 6, 1933. O. C. RITZ WOLLER 1,913,000
LICENSE PLATE HOLDER
Filed Jan. 21, 1931
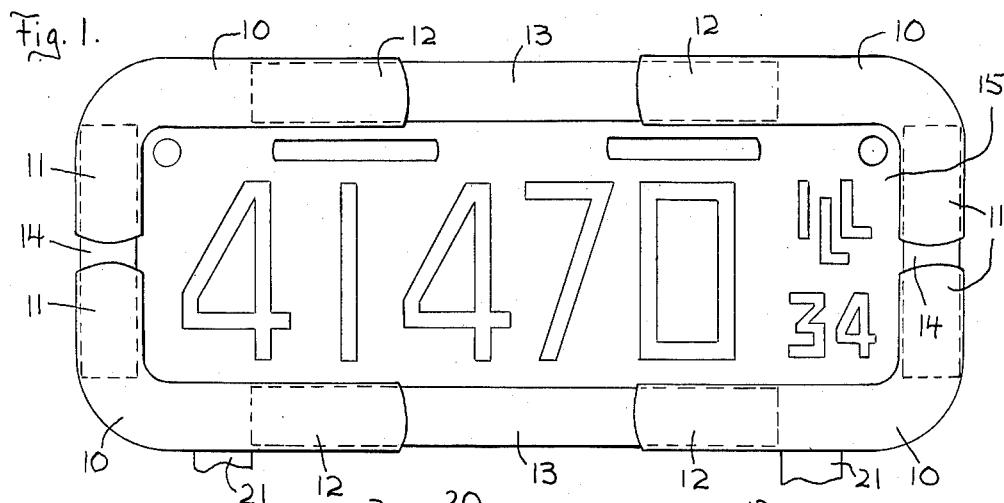
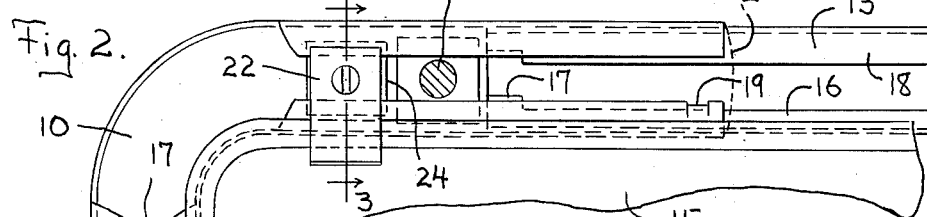
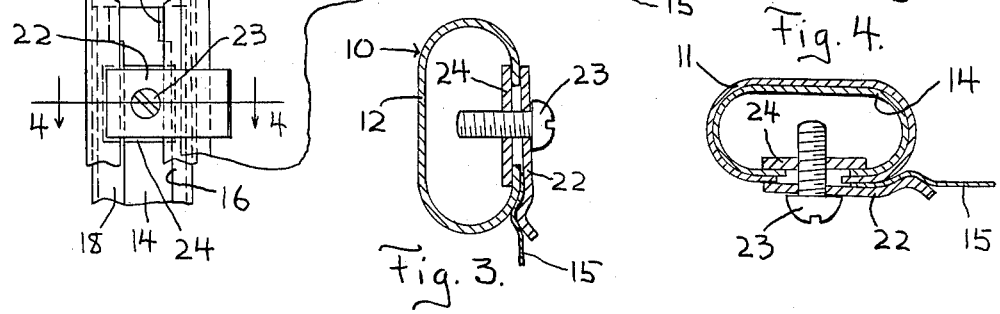
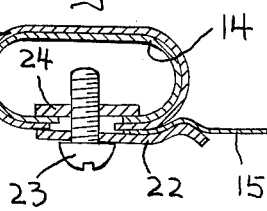
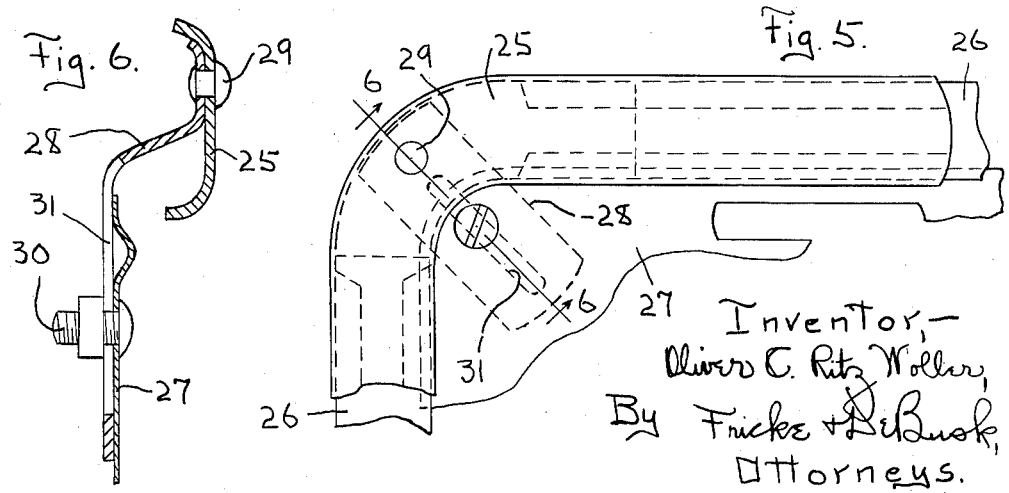

Patented June 6, 1933

1,913,000

UNITED STATES PATENT OFFICE

OLIVER C. RITZ WOLLER, OF CHICAGO, ILLINOIS

LICENSE PLATE HOLDER

Application filed January 21, 1931. Serial No. 510,207.

My invention relates to license plate holders for supporting plates of various sizes on automobiles, and it has for its objects the provision of a new and improved form and arrangement of parts by reason of which the holder may be attached to a license plate with the utmost of ease regardless of variations with respect to the size and shape of the plate and with respect to the size and location of the bolt openings. It is one of the objects of my invention to arrange my improved holder in such form as to have a pleasing appearance, being preferably in the form of a frame of polished white metal surrounding the license plate and completely symmetrical thereabout.

It is another object of my invention to provide improved means for securing the license plate in fixed position upon the frame, as well as improved means for securing the frame in position on a car. It is one of the objects of my invention to arrange the means for securing the plate upon the frame in such manner as to insure that the plate itself may serve to hold the several frame parts in rigid position with respect to each other, thus doing away with any necessity for providing special means for this purpose.

It is another object of my invention to improve devices of this type in sundry details hereinafter pointed out. The preferred means by which I have accomplished my several objects are illustrated in the drawing and are hereinafter specifically described. That which I believe to be new and desire to cover by Letters Patent is set forth in the claims.

In the drawing:—

Fig. 1 is a front face view of the preferred form of my license plate holder with a license plate secured in position thereon.

Fig. 2 is a rear view of one corner of the device as shown in Fig. 1, being shown upon an enlarged scale.

Figs. 3 and 4 are cross sectional views taken at line 3—3 and line 4—4 respectively of Fig. 2, being shown upon a slightly enlarged scale.

Fig. 5 is a front face view of one corner portion of an arrangement embodying a modified form of device; and Fig. 6 is a cross sectional view taken upon an enlarged scale at line 6—6 of Fig. 5.

Referring now to Figs. 1 to 4, in which corresponding parts are indicated by the same reference characters, 10 indicates four similar corner pieces, each comprising a short slotted tubular arm 11 and a longer slotted tubular arm 12, said arms 11 and 12 in the construction shown being formed integrally with each other. In the arrangement shown, the four corner pieces are connected together by two slotted tubular bars 13 slidably mounted in the longer arms 12 and two slotted tubular bars 14 slidably mounted in the shorter arms 11, the bars and corner pieces constituting a rectangular frame for a license plate 15.

As is best shown in Fig. 2, which shows one of the corner pieces 10 together with associated slotted tubular bars 13 and 14, the inner flange portion 16 of each of the slotted tubular bars is provided with a lug 17 at its end portion which extends inwardly at one side of the slot in said bar toward the flange 18 at the opposite side of the slot. The lug 17 is in such position at the end portion of the slotted tubular bar as to be brought into engagement with a lug 19 carried by the arm of the corner piece 10 in which such bar is slidably mounted, such lugs 17 and 19 serving to limit the sliding movement of the parts so as to prevent the parts from moving out of operative engagement with each other.

When it is desired to attach my improved holder upon a license plate such as the plate 15 as shown in Fig. 1, the frame is adjusted to the desired length and width and the plate 15 is placed in position on the rear surface of the frame as is shown in Fig. 2. Bolts 20 are then slid into position in the arms 12 which are to be at the top edge of the plate, the heads of the bolts 20 being threaded into position within the slotted tubular arms 12 by movement along the arms, as from the left in the device as shown in Fig. 2, such bolts 20 being provided for the purpose of attaching the plate and the frame to the supporting means for such parts. In the arrangement shown in Fig. 1, such supporting means comprises standards 21 of the ordinary type to which the bolts 20 are to be connected.

After the bolts 20 are engaged with the longer arms of the corner pieces, clips 22 are applied in position. As is best shown in Figs. 3 and 4, each of the clips 22 comprises a strip of sheet metal having one end bent into angled formation for fitting more or less snugly within the marginal groove on the rear face of a license plate. Bolts 23 extend through suitable openings in the clips 22 into screw threaded engagement with nuts 24, such nuts 24 being of a size to bridge the slots of the slotted tubular arms of the corner pieces as shown in Fig. 3, or to bridge the slots of the tubular bars 14, for example, as shown in Fig. 4. When the clips 22 are to be mounted in position, the clips are first threaded upon the bolts 23, and the nuts 24 are then applied. Thereupon the bolts are slid into position with the nuts on the inside of the tubular members and with the bolts extending outwardly through the slots. The clips are then adjusted into position with their angular portions engaging the groove of the license plate, the bolts being then tightened with respect to the nuts 24 so as to hold all of the parts comprising the clip, the license plate, and the tubular member in rigid relationship to each other. In the arrangement as shown in Fig. 4, the slotted tubular bars 14 will also be held by the tightened bolt and nut in rigid position with respect to the tubular arms 11 of the corner pieces. In the arrangement shown in Fig. 3, the corner pieces are held in rigid position with respect to the license plate independently of the tubular bars 13.

In the form of device shown in Figs. 5 and 6, corner pieces 25 are employed similar to the corner pieces 10, such corner pieces 25 being connected by means of slotted tubular bars 26 corresponding to the tubular bars 13 and 14 of the form first described. In the arrangement of said Figs. 5 and 6, a license plate 27 is secured in position upon the frame comprising the corner pieces and the bars 26 through the medium of brackets 28 which are secured in position upon the corner pieces by means of rivets 29, the inner ends of the brackets 28 being connected to the plate 27 by means of bolts 30 extending through the ordinary bolt holes of the license plate and through slots 31 of the brackets along which the bolts 30 are adjustable. With the corner pieces 25 held in position by means of their rigid connection with the license plate 27, the frame as a whole comprising the corner pieces and the bars 26 is afforded the necessary rigidity for insuring that the parts shall be held firmly as desired.

By the use of my improved arrangement, I have provided a license plate holder which is readily adjustable to any ordinary size of license plate, together with adjustable means for attaching the frame and the plate in position in the ordinary manner upon an automobile. The arrangement is such that the adjustment of the parts into operative relation can be effected quickly and easily and such that a ready replacement of a new plate in place of an old one can be effected.

While I prefer to employ the form of device as shown in my drawing and as above described, it is to be understood that my invention is not limited to such form, except so far as the claims may be so limited by the prior art.

I claim:—

1. In a device of the type described, the combination of four corner pieces each comprising two slotted tubular arms formed integrally with each other at substantially right angles to each other, four bars slidably mounted in said tubular arms respectively serving with said corner pieces to form a rectangular frame, clips adapted by engagement with the rear surface of the license plate to press said plate rigidly against said corner pieces, and bolts having sliding engagement with the inner surfaces of said tubular arms for connecting said clips rigidly with said corner pieces serving thereby to draw the clips into operative gripping engagement with said plate.

2. In a device of the type described, the combination of four corner pieces each comprising two slotted tubular arms formed integrally with each other at substantially right angles to each other, means for connecting said corner pieces together in the form of a rectangular frame, comprising two bars slidably mounted in the horizontally disposed arms of said corner pieces, and two slotted tubular bars slidably mounted in the other arms of said corner pieces, and means having a slidable mounting within said tubular parts adapted when tightened in position to hold said frame rigidly in adjusted position and to secure a license plate rigidly thereon.

3. In a device of the type described, the combination of four corner pieces each comprising two slotted tubular arms formed integrally with each other at substantially right angles to each other, means for connecting said corner pieces together in the form of a rectangular frame, comprising two bars slidably mounted in the horizontally disposed arms of said corner pieces, and two slotted tubular bars slidably mounted in the other arms of said corner pieces, nuts slidably mounted in the end portions of said tubular bars in the portions thereof located within the tubular arms of said corner pieces, bolts having screw-threaded connections with said nuts, and clips mounted on said bolts in engagement with the rear surface of a license plate for pressing the plate rigidly against the frame and to hold said tubular bars against endwise movement with respect to the corner pieces.

4. In a device of the type described, the combination of four corner pieces each comprising two flattened tubular arms formed integrally with each other at substantially right angles to each other and each slotted along its rear face, four flattened tubular bars slidingly mounted at both ends in said tubular arms respectively and each having a slot in its rear face registering with the slots in said arms, and gripping means mounted on said tubular members and slidable along said slots adapted by pressure on the inner faces of the bars and on the rear faces of the arms to hold said members in adjusted position with respect to each other.

5. In a device of the type described, the combination of four corner pieces each comprising two flattened tubular arms formed integrally with each other at substantially right angles to each other and each slotted along its rear face, four flattened tubular bars slidingly mounted at both ends in said tubular arms respectively and each having a slot in its rear face registering with the slots in said arms, and gripping means comprising clips mounted on said tubular members and slidable along said slots for holding said members in adjusted position for supporting a license plate pressed against the rear faces of said arms, said gripping means serving by pressure on the inner faces of the bars and on the rear faces of the arms and the rear face of the plate to hold all of said parts rigidly in adjusted position with respect to each other.

OLIVER C. RITZ WOLLER.